3,240,067
METHOD FOR COLLECTING GROUNDWATER SAMPLES IN SITU
Arnout Jongejan, 43 Fieldrow St., Ottawa 5, Ontario, Canada
Filed Oct. 21, 1963, Ser. No. 317,418
1 Claim. (Cl. 73—421)

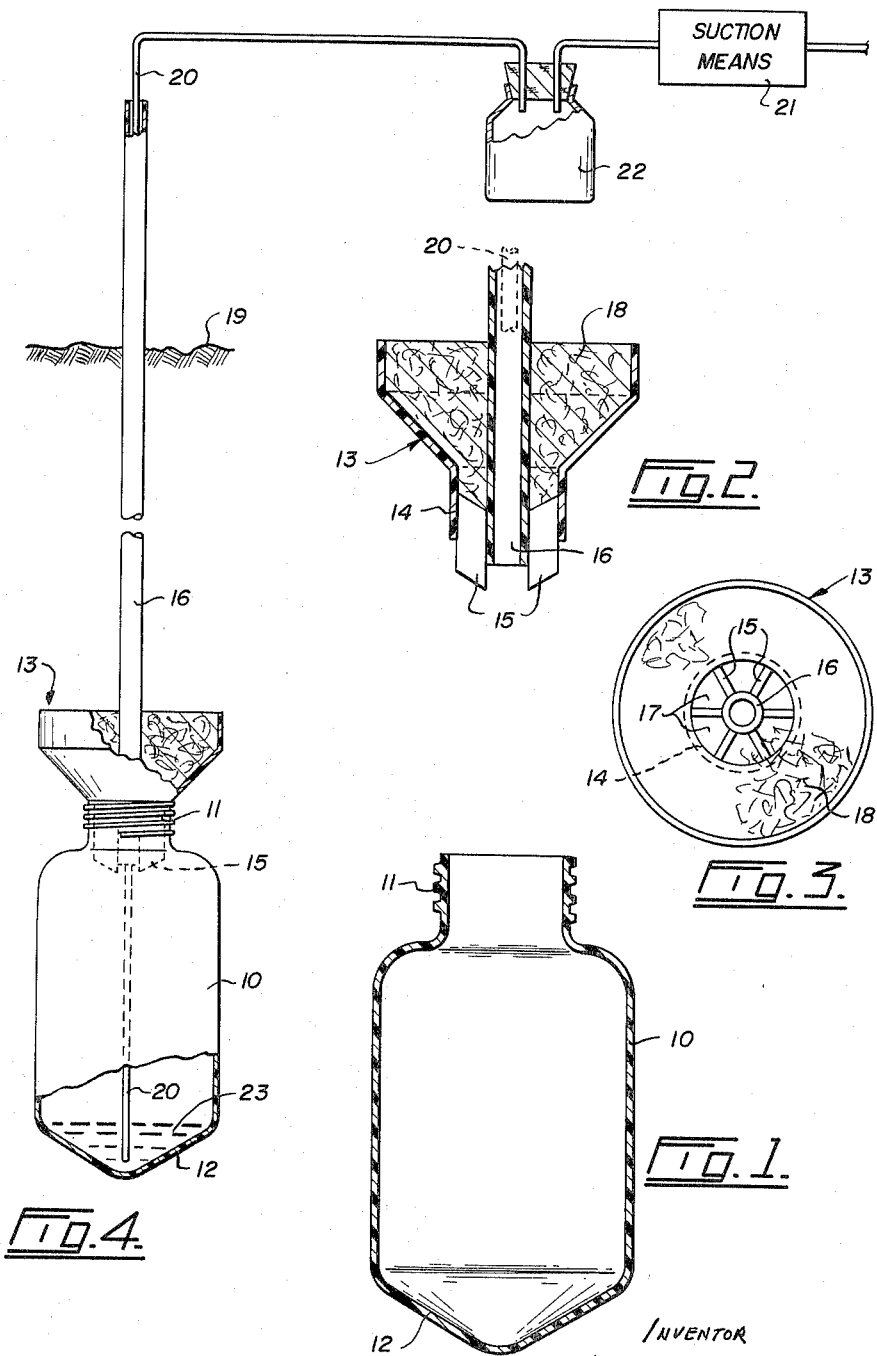

The present invention relates to a method and apparatus for collecting groundwater samples in situ.

More particularly, the invention relates to an apparatus which may be readily buried in the ground in order to collect a groundwater sample, and which may be removed for purposes of testing water collected therein, or from which the water sample may be drained without removing the collecting apparatus as will be explained hereinafter.

It is therefore an object of this invention to provide apparatus for collecting groundwater samples to permit the determination of the distribution of trace elements such as copper, zinc, cobalt, or molybdenum or to determine the quantity of dissolved fertilizer, or the movement of top toxic substances originating in sewage, variations in pH of the soil being tested, the penetration of humic acids, and so on.

It is a further object of this invention to provide apparatus whereby in relatively dry soil a small quantity of groundwater may be readily obtained for testing without removing the collecting apparatus from its buried position.

It is a still further object of the invention to provide apparatus for collecting groundwater samples whereby the groundwater is filtered as it is collected.

A still further object of the invention is to provide apparatus for collecting groundwater samples in situ comprising in combination a container having a downwardly dished bottom, an externally threaded neck on said container at the top thereof, a funnel having a neck adapted to be snugly received within the neck of said container, a plurality of lamellas fixedly attached at one end to the interior of said neck of said funnel and at their other end to a breather tube which extends upwardly centrally in said funnel and beyond the mouth thereof, filter material contained within said funnel above said lamellas, a suction tube having a smaller exterior diameter than the interior of said breather tube.

A more detailed description of the invention will be made with reference to the accompanying drawings, which are merely illustrative of the invention. The extent and scope of the invention should be limited only by the appended claim.

In the drawings:

FIGURE 1 is a cross-sectional view of a groundwater collection bottle;

FIGURE 2 is a cross-sectional view of a funnel and filter according to the invention;

FIGURE 3 is a top plan view of the funnel and filter of FIGURE 2; and

FIGURE 4 is a diagrammatic view of the groundwater collection and removal apparatus according to the invention.

With more detailed reference to the drawings, in FIGURE 1 a container 10 is of generally cylindrical configuration with a threaded neck 11. The bottom 12 of container 10 is dished downwardly, for reasons that will be explained hereinafter. Container 10 may be constructed of any suitable material, possibly coated with a wetting agent, although polyethylene will prove to be convenient for general purposes, so that the dished bottom 12 may be pressed upwardly and thus permit container 10 to rest upright on a flat surface. Externally threaded neck 11 of container 10 is adapted to receive a cap, not shown.

Referring now to FIGURES 2 and 3, a funnel, which may also be conveniently constructed of polyethylene or any other suitable material is indicated generally at 13. A neck 14 is adapted to be snugly received by the neck 11 of container 10. A plurality of lamellas 15 project from the interior of neck 14 and terminate in a circular interior tube 16 which projects upwardly beyond the mouth of funnel 13. As seen most clearly in FIGURE 3, lamellas 15 create a plurality of openings 17 through the neck 14 of funnel 13. Above lamellas 15 and within the main receptacle of funnel 13 is contained a suitable filter material 18, for example fibreglass, asbestos fibres, sintered ceramic material, cellulose, or any other organic filter material, possibly treated with a wetting agent.

Referring now to FIGURE 4, container 10 is shown buried below soil surface 19. Funnel 13 is shown in position, with its neck 14 snugly fitted within neck 11 of container 10. Tube 16 projects upwardly above the soil surface 19, and in FIGURE 4 is shown to contain a drainage tube 20 which projects into the container 10 to the centre of dished bottom 12. Tube 20 is of course smaller in exterior diameter than the interior diameter of tube 16. When suction is applied to receptacle 22 it will be appreciated that fluid 23 contained within buried container 10 may be drawn therefrom through tube 20 via the action of suction 21, into container 22.

In operation, container 10 fitted with funnel 13 is buried in the desired location, with tube 16 projecting above soil surface 19, to act as a breather. It should be mentioned that the size of the funnel may be varied, so that, for example, a smaller funnel may be used in loamy or sandy soil, than may be required for a clay soil. Also, the provision of neck 14 of container 10, which has been described for a general purpose vessel, is for specific applications not a necessity. In other words, the container 10 may be provided with an opening as large as the cross-section of the container itself, which is adapted to receive filter material thus eliminating both neck 14 on container 10 and funnel 13. In this alternative breather tube 16 will pass directly through filter material in the open end of container 10. In addition the depth at which the vessel is placed will depend on the purpose of the investigation being made. For instance, if the penetration of humic acids from the humic layer is being tested it will be necessary to bury the vessel below the humic layer. In burying the vessel an earth auger may be used, so that the soil may be replaced above the vessel after it has been positioned, without disturbing the various soil layers. As previously mentioned the apparatus may also be used for example, to determine the quantity of insecticide or weed killer dissolved in groundwater or to determine the distribution of trace elements such as copper, zinc, cobalt, or molybdenum in it, or the quantity of dissolved fertilizer or the movement of top toxic substances originating in sewage, and so on. When the apparatus has been positioned in the soil, it may be left unattended until a water sample has accumulated, and the length of time that will be required will of course depend on the amount of available water in the soil.

When a water sample has been collected in container 10, drainage tube 20 may be inserted through breather tube 16, as shown in FIGURE 4, and by suitable suction means the water sample removed therefrom.

It will be noted that the dished bottom 12 of container 10 facilitates the removal of water samples by means of suction tube 20, when a relatively small water sample has accumulated. Alternatively of course, container 10 may be itself removed from the soil, funnel 13 removed from the neck 11 of container 10, and the container then capped for transportation or storage until the water sample may be conveniently tested.

I claim:

The method of collecting groundwater samples in situ the steps comprising:

forming a hole in the soil to a depth corresponding to the desired location for collecting groundwater samples;

positioning in the bottom of said hole an imperforate open top container having its top closed with filter material and having a breather tube extending from the interior of said container through said filter material and above the ground surface;

refilling said hole;

positioning a suction tube interiorally of said breather tube and extending to the bottom of said container;

and withdrawing collected groundwater samples from said container by applying suction to said suction tube at desired intervals of time.

References Cited by the Examiner

UNITED STATES PATENTS

| | | | |
|---|---|---|---|
| 33,736 | 11/1861 | Elliott | 103—220 X |
| 365,951 | 7/1887 | Temple | 103—220 X |
| 834,268 | 10/1906 | Crumly | 166—228 X |
| 1,379,477 | 5/1921 | Perry | 103—220 |
| 2,355,620 | 8/1944 | Bower et al. | 73—421 |
| 2,761,833 | 9/1956 | Ward | 210—503 X |
| 2,995,037 | 8/1961 | Parker et al. | 73—421 |
| 3,003,643 | 10/1961 | Thomas | 210—503 X |

FOREIGN PATENTS 255,908  2/1949  Switzerland.

RICHARD C. QUEISSER, *Primary Examiner.*

DAVID SCHONBERG, *Examiner.*

JERRY W. MYRACLE, *Assistant Examiner.*